Patented Mar. 31, 1925.

1,531,991

UNITED STATES PATENT OFFICE.

FRANK N. SPELLER, OF PITTSBURGH, PENNSYLVANIA.

WATER DEACTIVATOR AND METHOD OF MAKING SAME.

No Drawing. Application filed March 28, 1922. Serial No. 547,548.

*To all whom it may concern:*

Be it known that I, FRANK N. SPELLER, a citizen of the United States, and resident of Pittsburgh, in the county of Allegheny and State of Pennsylvania, have invented a new and useful Water Deactivator and Method of Making Same, of which the following is a specification.

This invention relates to a water deactivator and method of making same and more particularly to a water deactivator including ferrous hydroxide, and has for its principal object the production of ferrous hydroxide in a commercial form, capable of being handled without serious oxidation in the atmosphere.

Heretofore it has not been possible to manufacture ferrous hydroxide in a commercial form, since it is slightly soluble in water and oxidizes rapidly when exposed to the atmosphere. Ferrous hydroxide has been manufactured under water and thus it has been kept, practicallly free from oxidation, but due to the bulk and weight of the package necessary to ship the product while it is under water this practice has not become widely used and is impracticable when large quantities are used such as is necessary to deactivate large amounts of water.

The present invention has overcome the above disadvantages and provides a product including ferrous hydroxide for deactivating water in such form that it will not be subject to serious oxidation in the atmosphere.

In carrying out my invention I produce ferrous hydroxide from ferrous sulphate, and a soluble salt, such as hydrate of lime, by intimately mixing the ferrous sulphate and salt while in a granulated form, and then pressing the so-formed mixture into briquettes at a pressure of not less than two thousand pounds per square inch, said pressure being sufficient to cause the formation of ferrous hydroxide and calcium sulphate, and resulting in the formation of briquettes which are rigid and strong enough to be handled, and which are subject to a minimum amount of oxidation when exposed to the atmosphere.

In order to further prevent oxidation by contact with the atmosphere, the formed briquettes preferably are cut up into small pieces or chunks and the so-formed pieces are dipped into silicate of soda solution or other similar preservative coating adapted to form an airproof covering over the pieces of briquette to prevent oxidation.

The briquettes, formed as above described, either as a whole or cut into pieces and coated with a preservative coating, form an excellent deactivator for water, which is adapted to absorb the active oxygen therefrom.

I claim:—

1. The method of forming a ferrous hydroxide composition which consists in mixing granular ferrous sulphate with a granular alkaline salt, and applying sufficient pressure thereto to form ferrous hydroxide.

2. The method of forming a ferrous hydroxide composition, which consists in mixing granular ferrous sulphate with a granular alkaline salt, and applying pressure thereto to form briquettes, said pressure being sufficient to change said ferrous sulphate to ferrous hydroxide.

3. The method of forming a ferrous hydroxide composition, which consists in mixing granular ferrous sulphate with granular hydrate of lime, and applying pressure thereto to form briquettes, said pressure being sufficient to change said ferrous sulphate and said hydroxide of lime to ferrous hydrate and calcium sulphate.

4. The method of making a water deactivator, which consists in mixing ferrous sulphate with a soluble salt, and applying sufficient pressure thereto to form ferrous hydroxide.

5. A composition, comprising ferrous hydroxide in combination with a soluble salt.

6. A briquette, composed of ferrous hydroxide in combination with a soluble salt.

7. A composition, comprising ferrous hydroxide in combination with a soluble salt.

8. As an article of manufacture, a rigid body composed of ferrous hydroxide in combination with a soluble salt, and a coating of preservative material.

9. As an article of manufacture, a rigid body composed of ferrous hydroxide in combination with calcium sulphate, and a coating of silicate of soda.

10. A briquette, containing ferrous hydroxide and a binding material, said material being slightly soluble in water.

In testimony whereof I have hereunto signed my name.

FRANK N. SPELLER.